Patented Sept. 24, 1935

2,015,179

UNITED STATES PATENT OFFICE 2,015,179

SKIN CLEANSING AND PURIFYING CREAM

George McGraw, Queens Village, N. Y., assignor to The Oakland Chemical Company, New York, N. Y., a corporation of New York No Drawing. Application August 15, 1930, Serial No. 475,641. Renewed January 24, 1935

4 Claims. (Cl. 167—91)

This invention relates to skin cleansing creams and more particularly concerns a skin cream containing peroxide of hydrogen.

Peroxide of hydrogen is a well known germicide and antiseptic containing a loosely associated atom of oxygen which is readily released upon contact with oxidizable material. The oxygen so released is in the nascent or active state and accordingly readily oxidizes germs and other organic matter. Due to the loosely associated oxygen, hydrogen peroxide is an effective skin cleansing agent, the oxygen released acting to clean out clogged pores and whiten the skin tissues. Although hydrogen peroxide has highly beneficial effects on the skin, it is difficult to maintain a sufficiently prolonged contact between the usual liquid solution of hydrogen peroxide and the skin tissues to obtain the full stimulating, cleansing and tonic action which the hydrogen peroxide is capable of producing.

It has heretofore been proposed to mix hydrogen peroxide with various carriers such as natural gums or starches and to employ such mixtures as skin cleansing products. So far as I am aware, such previously proposed mixtures have been unsatisfactory in that the hydrogen peroxide therein decomposes and gives up its loosely associated oxygen in a comparatively short time, whereby the beneficial oxidizing effect of the product is lost.

In accordance with my present invention, it is proposed to provide an improved and stable skin cleansing and purifying cream containing hydrogen peroxide, which cream retains the peroxide therein ready for use for extended periods. More specifically, it is proposed to provide a skin cream of the type generally known as a cold cream which contains hydrogen peroxide and a carrier for keeping the hydrogen peroxide therein, the cream being devoid of materials capable of reacting upon or decomposing hydrogen peroxide. Further, my cream contains no deleterious substances and includes nothing injurious to skin tissues which might counteract the beneficial properties of the hydrogen peroxide.

In carrying out my invention, I compound a cold cream comprising generally a wax, an oil and a fat, and add hydrogen peroxide thereto. I have discovered that a refined product obtained from wool fat or lanolin has the property of absorbing and retaining hydrogen peroxide and I use this product as the fatty ingredient of the cream. The refined wool fat product so employed comprises a mixture consisting of the esters of isocholesterin and oxycholesterin with oleic, myristinic and carnaubic acids to which petrolatum hydrocarbons are added as diluents. This product is obtained by selective extraction from wool fat from which the free saponifiable fatty acids have been removed, and comprise a highly refined, non-decomposed part of wool fat which is devoid of all ingredients capable of producing rancidity. One form of this refined wool fat product is marketed under the trade name "Eucerin."

Various waxes may be employed, but I prefer to employ a neutral acid-proof and alkali-proof wax which will not react with or decompose the hydrogen peroxide used. I have found that ozocerite or ozokerite is a satisfactory wax for this purpose. This wax is a natural mineral product and has the advantage of being amorphous or colloidal in form whereby a smooth and creamy consistency is imparted to the finished product thereby.

As a specific example of one way in which my improvided cream may be prepared, a quantity of ozocerite is melted at about 165° F. and the desired amount of the above described refined wool fat product is added thereto. The fat melts quickly in the hot molten ozocerite and a sufficient quantity of high grade mineral oil is stirred into the hot mixture to give the desired consistency to the finished product. The mixture is next cooled to about 100° F. and a suitable perfume, such as an essential oil, may be added thereto. A quantity of hydrogen peroxide of the desired strength is then heated to about 100° F. or to the temperature of the wax, fat and oil mixture, and is stirred into the mixture very slowly. The hydrogen peroxide is added until the refined wool fat product has absorbed its maximum capacity thereof, after which the cream is cooled and is ready for use. I have found that the above described fatty ingredient employed will absorb more than 200% by weight of hydrogen peroxide. The above described method of preparing my improved cream may be varied in many respects and the invention is not limited to a cream prepared in the particular manner herein set forth.

As a specific example of a satisfactory cream embodying my invention, I may use the above described ingredients in substantially the following proportions. About 10 grams of ozocerite may be used with about 45 grams of the above described refined wool fat product, 50 cubic centimeters of mineral oil and about 95 cubic centimeters of hydrogen peroxide. These proportions may be widely varied within the scope of the invention depending upon the desired consistency and strength of the finished product. The ozocerite is a stiffening agent and in the above proportions the amount thereof may be varied between about 25 grams and 100 grams. Other neutral waxes which will not react with or decompose hydrogen peroxide may be employed in place of ozocerite, if desired. The refined wool fat product may be used in substantially any proportions depending upon the amount of hydrogen peroxide desired in the cream. I have found that this product will absorb substantially 200% by weight of hydrogen peroxide, and the amount of hydrogen peroxide used is generally the maximum amount which will be absorbed by the refined wool fat product. The strength of hydrogen peroxide used may be varied to give the desired strength in the finished cream. The mineral oil is employed to thin out the cream, and may be used in any desired proportions to give the required consistency.

My improved cream is very effective as a skin cleansing, whitening and stimulating cosmetic and also has high desirable curative properties. The cream, and particularly the refined wool product therein, is readily absorbed by or penetrates the skin pores and so carries the hydrogen peroxide into intimate contact with germs, secretions and accumulations of foreign matter therein. The loosely associated oxygen of the hydrogen peroxide carried by the cream has a great affinity for the germs, poisons, secretions and foreign matter on the skin and in the skin pores. These substances are not only responsible for skin blemishes but are sometimes the cause of disfiguring skin diseases which are serious menaces to health and sometimes to life. Upon contact between the cream and these germs, poisons, secretions or other foreign substances, the oxygen is released from the cream and oxidizes and destroys them, leaving the skin in a cleansed and purified condition. Due to the fact that the loosely associated oxygen in the hydrogen peroxide does not escape from the cream to the atmosphere to any appreciable extent, a prolonged contact between the skin tissues and the hydrogen peroxide is obtained, and the liberated oxygen cleanses clogged up pores, bleaches blackheads, stimulates circulation, restores elasticity and has a general tonic effect upon the skin. Hydrogen peroxide is an effective deodorant, and this property is enhanced and prolonged when the peroxide is employed in my cream, since the peroxide is maintained in intimate contact with the skin for prolonged periods.

My improved skin cream further differs from known creams in that the loosely associated oxygen in the hydrogen peroxide is retained therein and is only released upon contact with oxidizable substances. Thus, the cream may be kept for prolonged periods without losing the beneficial effects described above. In general, I have found that my improved cream will retain the loosely associated oxygen for approximately the same periods as this oxygen is retained by a high grade stable solution of hydrogen peroxide.

In the specification and in the appended claims, the term "refined wool fat product" is employed to designate the above described mixture of the esters of isocholesterin and oxycholesterin with oleic, myristinic and carnaubic acids to which petrolatum hydrocarbons have been added, this product being obtainable by selective extraction from crude suint from which the saponifiable fatty acids have been removed.

I claim:

1. An ingredient for a stable skin cleansing and purifying cream comprising hydrogen peroxide carried by a fatty mixture of the esters of isocholesterin and oxycholesterin with oleic, myristinic and carnaubic acids.

2. A stable skin cleansing and purifying cream comprising ozocerite, a mineral oil and hydrogen peroxide carried by a fatty mixture of the esters of isocholesterin and oxycholesterin with oleic, myristinic and carnaubic acids to which petrolatum hydrocarbons have been added.

3. A stable skin cleansing and purifying cream comprising a wax, an oil and hydrogen peroxide carried by a refined wool fat product comprising a fatty mixture of the esters of isocholesterin and oxycholesterin with oleic, myristinic and carnaubic acids.

4. A stable skin cleansing and purifying cream comprising ozocerite, a mineral oil and hydrogen peroxide carried by a refined wool fat product comprising a fatty mixture of the esters of isocholesterin and oxycholesterin with oleic, myristinic and carnaubic acids to which petrolatum hydrocarbons have been added.

GEORGE McGRAW.